(12) United States Patent
Zhou (10) Patent No.: US 12,543,781 B2
(45) Date of Patent: Feb. 10, 2026

(54) ELECTRONIC VAPORIZATION DEVICE AND POWER SUPPLY ASSEMBLY

(71) Applicant: SHENZHEN SMOORE TECHNOLOGY LIMITED, Guangdong (CN)

(72) Inventor: Jianguang Zhou, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 479 days.

(21) Appl. No.: 17/730,641

(22) Filed: Apr. 27, 2022

(65) Prior Publication Data

US 2022/0354170 A1    Nov. 10, 2022

(30) Foreign Application Priority Data

May 6, 2021   (CN) .......................... 202120957807.X (51) Int. Cl.
*A24F 40/40* (2020.01)
*A24F 40/10* (2020.01)
*A24F 40/485* (2020.01)
*A24F 40/51* (2020.01)
*A24F 40/60* (2020.01)
*A24F 40/90* (2020.01)

(52) U.S. Cl.
CPC .............. *A24F 40/40* (2020.01); *A24F 40/10* (2020.01); *A24F 40/51* (2020.01); *A24F 40/60* (2020.01); *A24F 40/90* (2020.01)

(58) Field of Classification Search
CPC ................................ A24F 40/10; A24F 40/40
See application file for complete search history.

(56) References Cited

FOREIGN PATENT DOCUMENTS

| CN | 208510076 U | * | 2/2019 | ............. A24F 40/40 |
| CN | 110226778 A | * | 9/2019 | ............. A24F 40/40 |
| CN | 111671152 A | * | 9/2020 | ............. A24F 40/10 |
| CN | 212345289 U | * | 1/2021 | |
| WO | WO-2020243821 A1 | * | 12/2020 | ............. A24F 40/42 |

OTHER PUBLICATIONS

English Machine Translation of CN 110226778 A, obtained from PE2E Search (Clarivate Analytics) (Year: 2019).*
English Machine Translation of CN 208510076 U, obtained from PE2E Search (Clarivate Analytics) (Year: 2019).*
English Machine Translation of CN 212345289 U, obtained from PE2E Search (Clarivate Analytics) (Year: 2021).*
English Machine Translation of CN 111671152 A, obtained from PE2E Search (Clarivate Analytics) (Year: 2020).*

* cited by examiner

*Primary Examiner* — Philip Y Louie
*Assistant Examiner* — Charlotte Davison
(74) *Attorney, Agent, or Firm* — Leydig, Voit & Mayer, Ltd.

(57) ABSTRACT

A power supply assembly for supplying power to a vaporization component, the power supply assembly including: a shell; a power supply mounted in the shell; an airflow sensing apparatus disposed in the shell; a holder mounted in the shell, the holder being disposed on one end of the power supply, the airflow sensing apparatus being disposed on the holder, the holder isolating the power supply from the vaporization component; an airflow channel provided in the shell; and a start airway for starting the airflow sensing apparatus, the start airway being provided on the holder. The airflow channel and/or the start airway are/is isolated from the power supply by the holder.

20 Claims, 7 Drawing Sheets

ELECTRONIC VAPORIZATION DEVICE AND POWER SUPPLY ASSEMBLY

CROSS-REFERENCE TO PRIOR APPLICATION

Priority is claimed to Chinese Patent Application No. CN 202120957807.X, filed on May 6, 2021, the entire disclosure of which is hereby incorporated by reference herein.

FIELD

The present invention relates to vaporization devices, and more specifically, to an electronic vaporization device and a power supply assembly.

BACKGROUND

In the related art, an electronic vaporization device is mainly made of a vaporizer and a power supply assembly. A design defect of the existing power supply assembly lies in that, if a specific condition occurs, a power supply in the power supply assembly explodes in an inhaling process, impact force of the power supply may cause a potential safety risk. Especially, when a battery faces a direction of a nozzle, the impact force may impact powders exploded in the power supply, a pin of an electrode, or tiny parts in the vaporization device to a mouth or a face of a person, which is very dangerous. In addition, the power supply assembly cannot pass security tests of UL8139 in a product testing process.

SUMMARY

In an embodiment, the present invention provides a power supply assembly for supplying power to a vaporization component, the power supply assembly comprising: a shell; a power supply mounted in the shell; an airflow sensing apparatus disposed in the shell; a holder mounted in the shell, the holder being disposed on one end of the power supply, the airflow sensing apparatus being disposed on the holder, the holder isolating the power supply from the vaporization component; an airflow channel provided in the shell; and a start airway configured to start the airflow sensing apparatus, the start airway being provided on the holder, wherein the airflow channel and/or the start airway are/is isolated from the power supply by the holder.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides an improved power supply assembly and further provides an improved electronic vaporization device.

In an embodiment, the present invention provides a power supply assembly, configured to supply power to a vaporization component, including a shell, a power supply mounted in the shell, an airflow sensing apparatus disposed in the shell, and a holder mounted in the shell, where the holder is disposed on one end of the power supply; the airflow sensing apparatus is disposed on the holder, and the holder isolates the power supply from the vaporization component;
 an airflow channel is provided in the shell;
 a start airway for starting the airflow sensing apparatus is provided on the holder; and
 the airflow channel and/or the start airway are/is isolated from the power supply through the holder.

Preferably, the holder includes a fixing base for fixing the vaporization component; and
 the start airway is provided on the fixing base.

Preferably, the fixing base includes a base body and a fixing portion disposed on the base body in a protruding manner for fixing the vaporization component; and
 the start airway is provided on the fixing portion.

Preferably, a through hole for connecting the vaporization component with the power supply is provided on the fixing portion; and
 the through hole and the start airway are provided at intervals and are isolated from each other.

Preferably, a liquid storage groove is provided on the base body.

Preferably, the fixing base further includes two engagement portions disposed on the base body in a protruding manner and located on two opposite sides of the fixing portion to engage with the shell.

Preferably, the holder further includes a mounting base for mounting the airflow sensing apparatus; and
 the fixing base is disposed on one end of the mounting base away from the power supply.

Preferably, a mounting hole for mounting the airflow sensing apparatus is provided on the mounting base; and
 the start airway is in communication with the mounting hole.

Preferably, the power supply assembly further includes a first seal structure; the first seal structure is sleeved on a periphery of the airflow sensing apparatus to isolate the start airway from the power supply; and
 a connection through hole communicating the start airway with the airflow sensing apparatus is provided on the first seal structure.

Preferably, the power supply assembly further includes a second seal structure, and the second seal structure is sleeved on the holder to sealedly connect the holder with the shell.

Preferably, the airflow channel includes an air inlet channel provided in the shell and located on one end of the holder away from the power supply.

Preferably, an air inlet groove for communicating the air inlet channel with the vaporization component is provided on the holder.

Preferably, an air inlet hole in communication with the airflow channel is provided on the shell.

Preferably, the power supply assembly further includes a light emitting device mounted on the holder.

Preferably, the power supply assembly further includes a light guide component guiding light emitted by the light emitting device; and the light guide component is mounted on the holder and sleeved on a periphery of the light emitting device.

Preferably, the holder is clamped to the light guide component.

Preferably, the power supply assembly further includes a charging interface connected to the power supply.

Preferably, a mounting opening for mounting the charging interface is provided on one end of the shell; and the mounting opening is provided on one end of the power supply away from the holder.

The present invention constructs an electronic vaporization device, including the power supply assembly according to the present invention and a vaporization component connected to the power supply assembly, where the vaporization component is mounted in the shell of the power supply assembly.

Preferably, the vaporization component includes a vent tube mounted on the holder and a vaporization element mounted in the vent tube;

an air outlet is provided on the shell;

the vent tube is in communication with the air outlet; and an airflow channel is formed in the shell and the vent tube.

Implementation of the electronic vaporization device and the power supply assembly in the present invention has the following beneficial effects: In the power supply assembly, the holder for mounting the airflow sensing apparatus is disposed in the shell and located on one end of the power supply, the power supply and the vaporization component are isolated through the holder, and the start airway and the airflow channel are isolated from the power supply through the holder. In this way, when a dangerous condition that the power supply explodes occurs, airflow that is generated at a moment faces away from one end of a human face, thereby improving the use security of the electronic vaporization device.

In order to have a clearer understanding of the technical features, the objectives, and the effects of the present invention, specific implementations of the present invention are now illustrated in detail with reference to the accompanying drawings.

Figure 1:
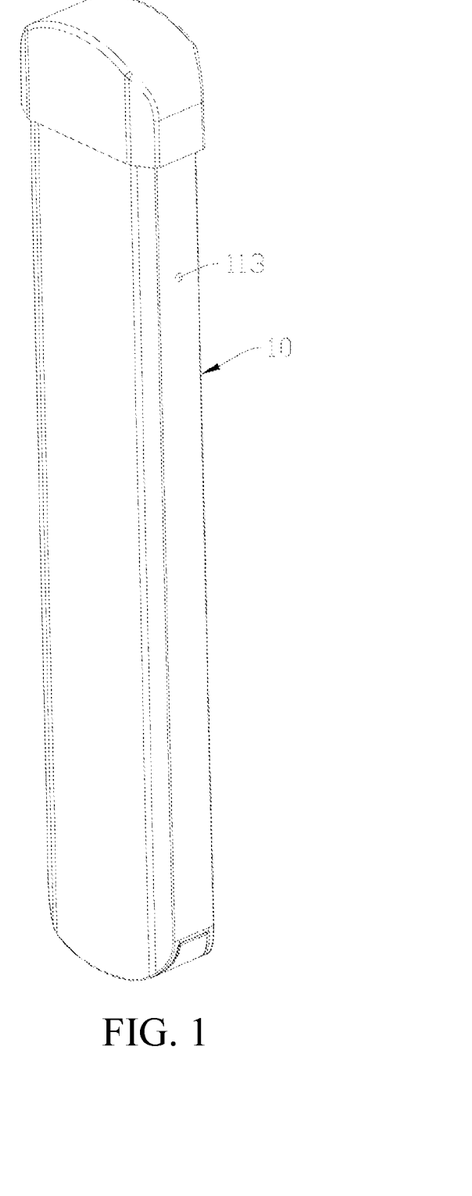
FIG. 1 is a schematic structural diagram of an electronic vaporization device according to some embodiments of the present invention.
Figure 2:
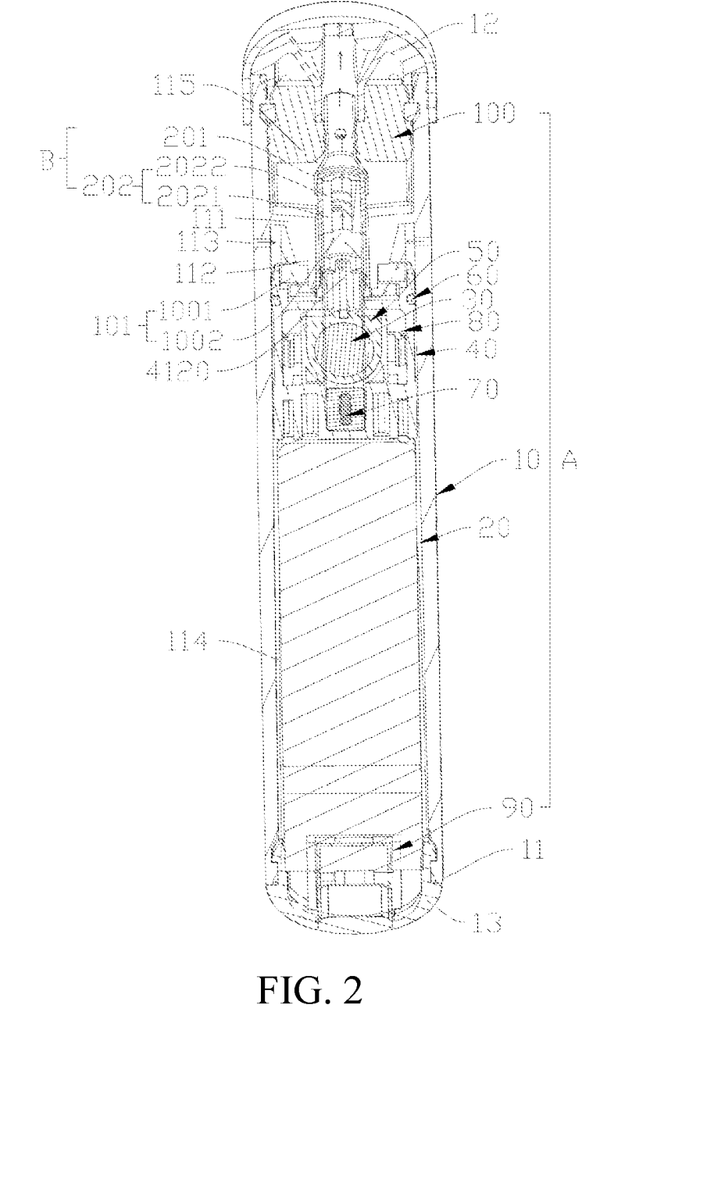
FIG. 2 is a cross-sectional view of the electronic vaporization device shown in FIG. 1.

FIG. 1 and FIG. 2 show some preferred embodiments of an electronic vaporization device of the present invention. The electronic vaporization device may be a disposable electronic vaporization device. Certainly, it may be understood that, in some other embodiments, the electronic vaporization device may not be limited to the disposable electronic vaporization device.

Figure 3:
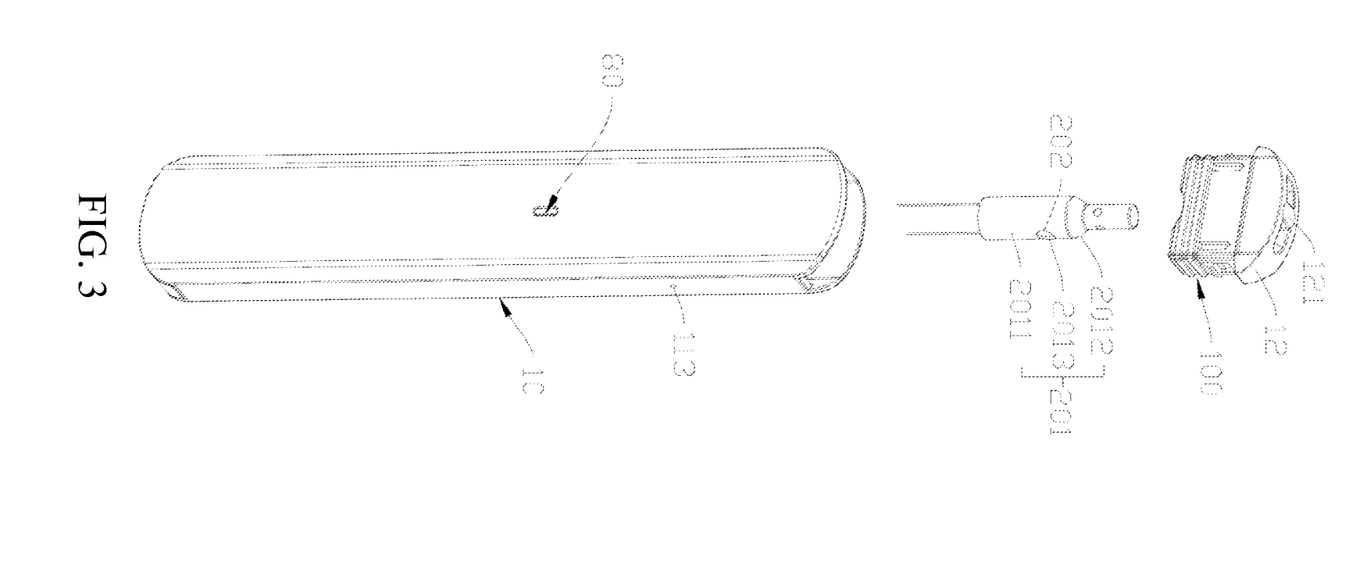
FIG. 3 is a schematic partial structural exploded view of the electronic vaporization device shown in FIG. 1.

As shown in FIG. 1 to FIG. 3, in some embodiments, the electronic vaporization device may include a power supply assembly A and a vaporization component B, and the vaporization component B may be configured to heat a vaporization medium. The power supply assembly A may be mechanically and/or electrically connected to the vaporization component B to supply power to the vaporization component B.

Further, in some embodiments, the power supply assembly A may include a shell 10, a power supply 20, an airflow sensing apparatus 30, and a holder 40. The shell 10 may be configured to accommodate the power supply 20, the airflow sensing apparatus 30, and the holder 40. The power supply 20 may be disposed in the shell 10 and configured to supply power to the vaporization component B. The airflow sensing apparatus 30 may be disposed in the shell 10 and mounted on the holder 40, and may be configured to start the vaporization component B. The holder 40 may be disposed in the shell 10, located on one end of the power supply 20, and configured to mount the airflow sensing apparatus 30 and isolate the power supply 20 from the vaporization component B.

Figure 4:
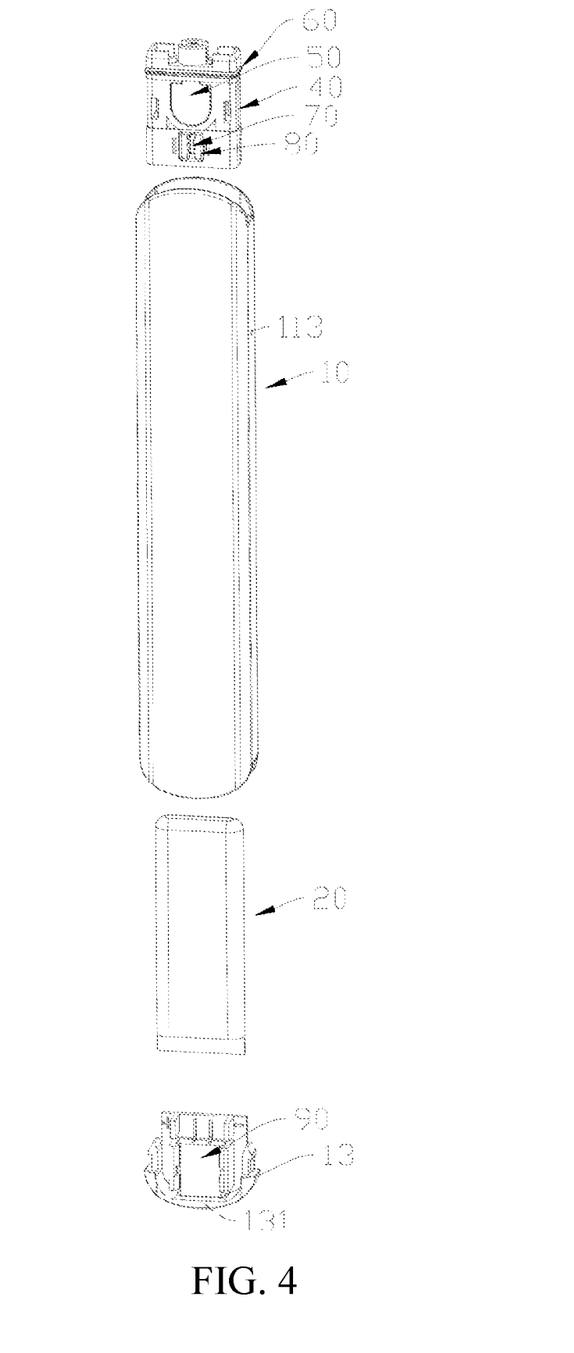
FIG. 4 is a schematic partial structural exploded view of a power supply assembly of the electronic vaporization device shown in FIG. 3.

As shown in FIG. 2 to FIG. 4, further in some embodiments, the shell 10 may be in a shape of a flat long cylinder. Certainly, it may be understood that, in some other embodiments, the shell 10 may not be limited to the shape of a flat long cylinder. In some embodiments, the shell 10 may be a plastic injection member. Certainly, it may be understood that, in some other embodiments, the shell 10 may alternatively be a metal member. In some embodiments, the shell 10 may include a housing 11, a first end cap 12, and a second end cap 13.

The housing 11 may be in a shape of a flat long cylinder with openings on two ends for mounting the first end cap 12 and the second end cap 13. An inner side of the housing 11 may be a hollow structure, a middle lower part of the housing 11 may form an accommodating cavity 114, and the accommodating cavity 114 may be configured to accommodate the power supply 20 and the holder 40. An upper part of the housing 11 may form a liquid storage cavity 115 configured to store a liquid vaporization medium. In some embodiments, the housing 11 may include an isolating wall 111, and the isolating wall 111 may be configured to separate an inner space of the housing 11 into the accommodating cavity 114 and the liquid storage cavity 115. In some embodiments, a sleeve portion 112 extending toward a direction of the accommodating cavity 114 may be disposed on the isolating wall 111, and the sleeve portion 112 may be sleeved on a part of a periphery of the vaporization component B and engage with the vaporization component B. The sleeve portion 112 may be in a shape of an inverted cone frustum or an inverted cone. In some embodiments, an air inlet hole 113 may be provided on the shell 10, and the air inlet hole 113 may be located on a side wall of the housing 11 and in communication with an airflow channel 101 to allow external gas to enter the housing 11.

Further, in some embodiments, a part of the first end cap 12 may be disposed and inserted from an opening set by the housing 11 close to the liquid storage cavity 115 into the housing 11. The first end cap 12 may be configured to form a mouthpiece for a user to inhale. In some embodiments, an air outlet 121 may be provided on the shell 10. Specifically, the air outlet 121 may be provided on the first end cap 12 or may be located at a central axis of the first end cap 12.

Further, in some embodiments, a part of the second end cap 13 may be disposed and inserted from an opening set by the housing 11 close to the accommodating cavity 114 into the housing 11. The second end cap 13 may support the power supply 20. In some embodiments, a mounting opening 131 may be provided on one end of the shell 10. Specifically, the mounting opening 131 may be located on the second end cap 13. Specifically, the mounting opening 131 may be provided on one end of the power supply 20 away from the holder 40, and the mounting opening 131 may be configured to mount a charging interface 90 to facilitate a connection between an external power supply and the charging interface 90.

Further, in some embodiments, the airflow channel 101 may be provided in the shell 10. The airflow channel 101 may send out vapor formed after vaporization of the vaporization component B. The airflow channel 101 may be in communication with the air inlet hole 113 and the air outlet 121. In some embodiments, the airflow channel 101 may include an air inlet channel 1001 and an air outlet channel 1002, where the air inlet channel 1001 is in communication with the air inlet hole 113 and may be provided in the shell 10 and located on one end of the holder 40 away from the power supply 20. Specifically, the air inlet channel 1001 may be located at a periphery of the sleeve portion 112 and may be in communication with an air inlet groove 4123 of the holder 40. External gas may enter the air inlet channel 1001 from the air inlet hole 113, and enter the vaporization component B from the air inlet groove 4123. The air outlet channel 1002 may be located in the vaporization component B and may be in communication with the air inlet channel 1001 through the air inlet groove 4123 to output vapor formed after vaporization.

Further, in some embodiments, the power supply 20 may be a battery, and the battery may be a rechargeable battery. Certainly, it may be understood that, in some other embodiments, the battery may not be limited to the rechargeable battery and may be a disposable battery.

Further, in some embodiments, the airflow sensing apparatus 30 may be a microphone. It may be understood that, in some other embodiments, the airflow sensing apparatus 30 may not be limited to the microphone and may be a micro-electro-mechanical system (MEMS) sensor.

Figure 5:
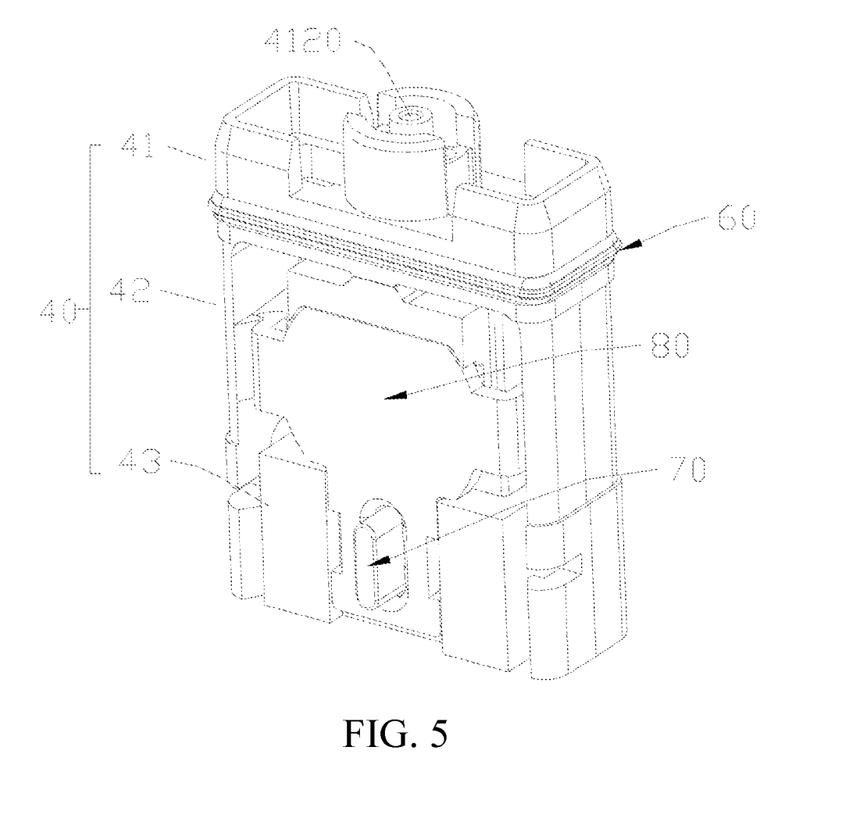
FIG. 5 is a schematic structural diagram of assembly of a holder, an airflow sensing apparatus, a light guide component, a first seal structure, and a light emitting device of the power supply assembly shown in FIG. 4.
Figure 6:
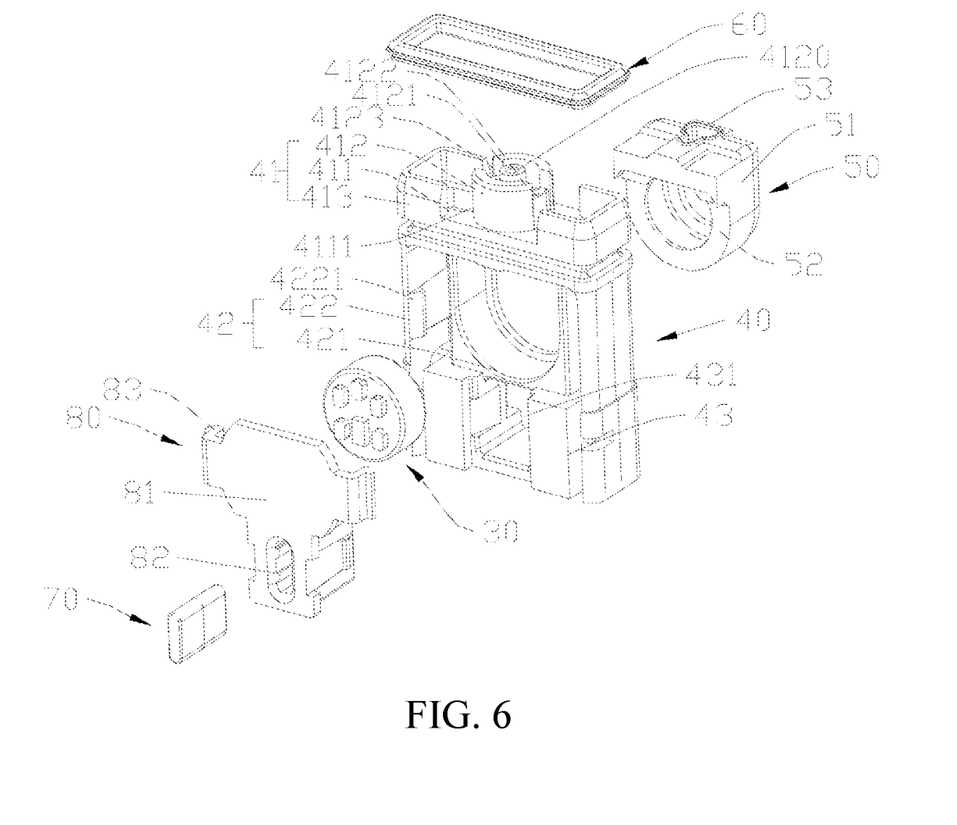
FIG. 6 is a schematic structural exploded view of the holder, the airflow sensing apparatus, the light guide component, the first seal structure, and the light emitting device of the power supply assembly shown in FIG. 5.
Figure 7:
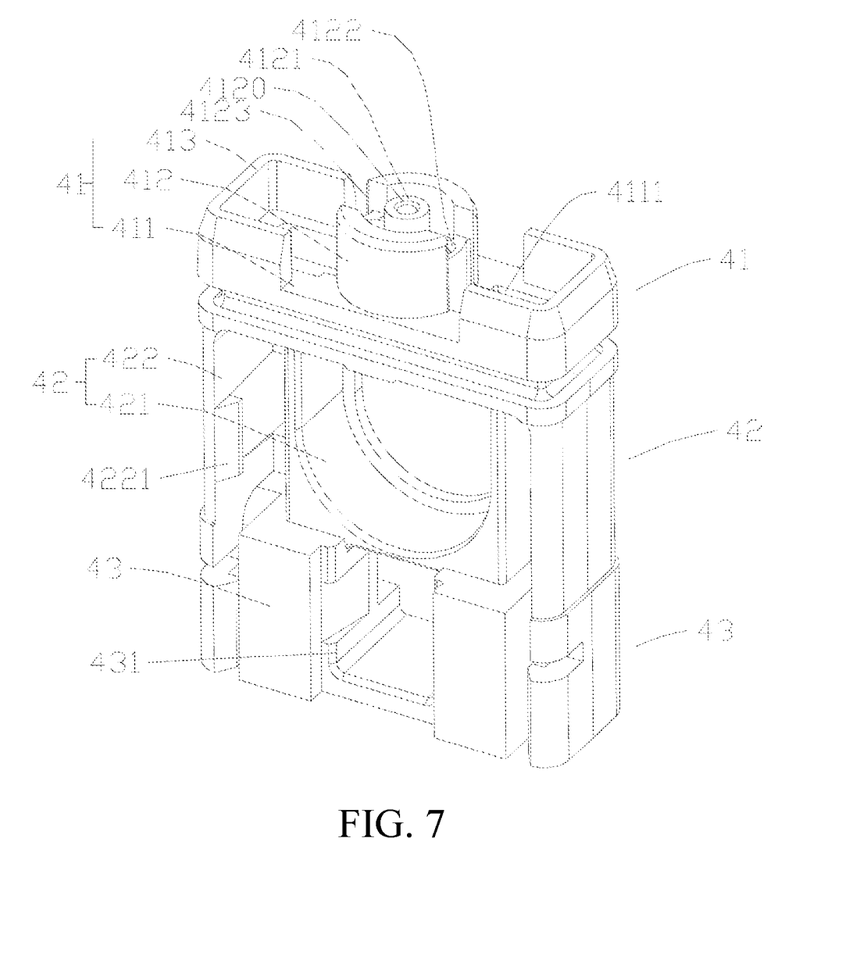
FIG. 7 is a schematic structural diagram of the holder of the power supply assembly shown in FIG. 6.

As shown in FIG. 5 to FIG. 7, further, in some embodiments, the holder 40 may be approximately in a shape of a cuboid and the entire holder may be used as a buffer member to isolate the power supply 20 from the vaporization component B and prevent communication between the airflow channel 101, the start airway 4120, and the power supply. Therefore, when a dangerous situation that the power supply explodes occurs, airflow that is generated at a moment may face away from one end of a human face, namely, the generated airflow is discharged from the mounting hole 131. The holder 40 may be located on one end of the power supply 20 away from the second end cap 13. In some embodiments, the holder 40 may include a fixing base 41, a mounting base 42, and a support base 43. The fixing base 41, the mounting base 42, and the support base 43 may be disposed sequentially in a direction approaching the power supply 20. The fixing base 41, the mounting base 42, and the support base 43 may be integrally formed. Specifically, in some embodiments, the fixing base 41, the mounting base 42, and the support base 43 may be integrally formed through injection. The fixing base 41 may be configured to fix the vaporization component B. The mounting base 42 may be configured to mount the airflow sensing apparatus 30. The support base 43 may support the mounting base 42 and the fixing base 41 and may be configured to mount a light emitting device 70.

Further, in some embodiments, the fixing base 41 may include a base body 411, a fixing portion 412, and a engagement portion 413. The base body 411 may be in a shape of a cuboid. A liquid storage groove 4111 may be provided on the base body 411, there may be two liquid storage grooves 4111, and the two liquid storage grooves 4111 may be provided at intervals. The liquid storage groove 4111 may be configured to store condensed liquid of the vaporization component B or liquid leaked from the vaporization component B. In some embodiments, the fixing portion 412 may be in a shape of a column. Specifically, in some embodiments, the fixing portion 412 may be in a shape of a cylinder. The fixing portion 412 may be disposed on the base body 411 and may be located between the two liquid storage grooves 4111. The fixing portion 412 may be disposed in manner of protruding out of the base body 411 toward a direction of the liquid storage cavity 115 and may be configured to mount and fix the vaporization component B. In some embodiments, the vaporization component B may be sleeved on the fixing portion 412. In some embodiments, a start airway 4120 may be provided on the holder 40. Specifically, the start airway 4120 may be provided on the fixing base 41 and located on the fixing portion 412. The start airway 4120 may be in communication with the airflow sensing apparatus 30 and may be configured to start the airflow sensing apparatus 30. In some embodiments, a central column 4121 may be disposed on the fixing portion 412, and an inner side of the central column 4121 may be a hollow structure with two run-through ends. The start airway 4120 may be formed in the central column 4121. Further, in some embodiments, a through hole 4122 may be provided on the fixing portion 412. The through hole 4122 may be provided on the fixing portion 412 and located on two opposite sides of the central column 4121, and the through hole 4122 may be provided for a lead to run through for ease of a connection between the vaporization component B and the power supply 20. In some embodiments, the through hole 4122 and the start airway 20 may be provided at intervals and isolated from each other. In some embodiments, an air inlet groove 4123 may be provided on the holder 40. Specifically, the air inlet groove 4123 may be provided on a side wall of the fixing portion 412 and located on two opposite sides of the fixing portion 412. The air inlet groove 4123 may be configured to communicate the air inlet channel 1001 with the vaporization component B for gas to enter the vaporization component B. In some embodiments, there may be two engagement portions 413. The two engagement portions 413 may be disposed on the base body 411 in a protruding manner and located on two opposite sides of the fixing portion 412. The engagement portion 413 may be enclosed on a periphery of the fixing portion 412, an outer side wall of the engagement portion 413 may be attached to an inner side wall of the shell 10 to engage with the shell 10. A space is spared between the engagement portion 413 and the fixing portion 412, and the space may facilitate assembly of the vaporization component B.

Further, in some embodiments, the mounting base 42 may be disposed on one end of the fixing base 41, and the mounting base 42 may include a mounting hole 421 and a resisting wall 422 disposed outside the mounting hole 421 and of which one end is connected to the fixing base 41. The mounting hole 421 may be configured to mount the airflow sensing apparatus 30. A shape and a size of the mounting hole 421 may match a shape and a size of the airflow sensing apparatus 30. In some embodiments, the mounting hole 421 may be provided penetrating in a thickness direction of the holder 40. The start airway 4120 may be provided on one end of the mounting hole 421 away from the power supply 20 and may be in communication with the mounting hole 421 to further be in communication with the airflow sensing apparatus 30.

Further, in some embodiments, a positioning hole 431 for mounting and positioning the light emitting device 70 may be provided on the support base 43. The positioning hole 431 may be located at a middle part of the support base 43 and may be provided penetrating in a thickness direction of the support base 43.

Further, in some embodiments, the power supply assembly A may further include a first seal structure 50. The first seal structure 50 may be embedded in the mounting hole 421, sleeved on a periphery of the airflow sensing apparatus 30, configured to sealedly connect the holder 40 with the shell 10, and configured to isolate the start airway 4120 from the power supply 20. In some embodiments, the first seal structure 50 may be a seal sleeve and may be made of an elastic material such as silica gel. The first seal structure 50 may include a sleeve body 51, an accommodating groove 52, and a connection through hole 53. A shape and a size of the sleeve body 51 may match the shape and the size of the mounting hole 421. The accommodating groove 52 may be provided on the sleeve body 51 and may be configured to accommodate the airflow sensing apparatus 30. The connection through hole 53 may be provided on the sleeve body 51 and in communication with the accommodating groove 52 and the start airway 4120, and communicate the start airway 4120 with the airflow sensing apparatus 30.

Further, in some embodiments, the power supply assembly further includes a second seal structure 60; and the second seal structure 60 may be sleeved on the holder 40, the second seal structure 60 may be a seal ring, and the seal ring may be sleeved between the fixing base 41 and the mounting base 42. The second seal structure 60 may be configured to sealedly connect the holder 40 with the shell 10, to further physically isolate the power supply 20 from the vaporization component B.

Further, in some embodiments, the power supply assembly further includes a light emitting device 70. The light emitting device 70 may be mounted on the holder 40, the light emitting device 70 may be a light post, and the light post may be mounted in the positioning hole 431 on the support base 43. In some embodiments, a light cover may be further sleeved on the light post.

Further, in some embodiments, the power supply assembly further includes a light guide component 80. The light guide component 80 may be mounted on the holder 40 and sleeved on a periphery of the light emitting device 70, and may be configured to guide light emitted by the light emitting device 70. In some embodiments, the light guide component 80 may be clamped to the holder 40. In some embodiments, the light guide component 80 may include a light guide plate 81 and a via 82 provided on the light guide plate 81. The light guide plate 81 may be disposed extending from the support base 43 to the mounting base 42. The via 82 may be provided opposite to the positioning hole 431 and may be configured for the light emitting device 70 to run through. Two opposite sides of the light guide plate 81 may be provided with hooks 83, and an inner side of the resisting wall 422 of the mounting base 42 may be provided with buckles 4221. The buckles 4221 may be disposed corresponding to the hooks 83 to be clamped to the hooks 83.

As shown in FIG. 2 to FIG. 4, further, in some embodiments, the power supply assembly A may further include a charging interface 90. The charging interface 90 may be mounted at the second end cap 13 and provided corresponding to the mounting hole 131, electrically connected to the power supply 20, and configured to access electrical energy to the power supply 20 to charge the power supply 20. In some embodiments, the charging interface 90 may be a USB interface. Certainly, it may be understood that, in some other embodiments, the charging interface 90 may not be limited to the USB interface, and in some other embodiments, the charging interface 90 may alternatively be a Type-C interface.

Further, in some embodiments, the power supply assembly A may further include a third seal structure 100. The third seal structure 100 may be a seal ring, and the third seal structure 100 may be sleeved on the first end cap 12 and configured to sealedly connect the first end cap with the housing 11.

Further, in some embodiments, the vaporization component B may include a vent tube 201 and a vaporization element 202, and the vent tube 201 may be mounted on the holder 40. Specifically, the vent tube 201 may run through a middle through hole of the sleeve portion 112 and sleeved on the fixing portion 412 of the fixing base 41, and may be in communication with the air outlet 121. In some embodiments, the vent tube 201 may include a first tube section 2011 and a second tube section 2012 disposed on one end of the first tube section 2011. The first tube section 2011 may be sleeved on the fixing portion 412. A radial size of the second tube section 2012 may be less than a radial size of the first tube section 2011 and may extend toward the air outlet 121 to be in communication with the air outlet 121. In some embodiments, a liquid inlet hole 2013 may be provided on the vent tube 201. The liquid inlet hole 2013 may be provided on a side wall of the first tube section 2011 and in communication with the liquid storage cavity 115 for liquid to enter the first tube section 2011. The vaporization element 202 may be disposed in the vent tube 201 and electrically connected to the power supply 20. Specifically, in some embodiments, the vaporization element 202 may include a vaporization core 2021 and a heating wire 2022 disposed in the vaporization core 2021. The vaporization core 2021 may be disposed in the first tube section 2011, and liquid inlet may be implemented through the liquid inlet hole 2013. The heating wire 2022 may be disposed on the vaporization core 2021 and may be configured to heat a liquid medium in the vaporization core 2021. The heating wire 2022 may be connected to the power supply 20 by disposing a lead, and the lead may be disposed penetrating from the through hole 4122 to the power supply 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A power supply assembly for supplying power to a vaporization component, the power supply assembly comprising:
   a shell;
   a power supply mounted in the shell;
   an airflow sensing apparatus disposed in the shell;
   a holder mounted in the shell, the holder being disposed on one end of the power supply, the airflow sensing apparatus being disposed on the holder, the holder isolating the power supply from the vaporization component, the holder comprising:
      a sleeve portion disposed so as to sleeve at least a part of a periphery of the vaporization component;
      an airflow channel provided in the shell; and
      a start airway configured to start the airflow sensing apparatus, the start airway being provided on the holder,
   wherein the airflow channel and/or the start airway are/is isolated from the power supply by the holder,
   wherein the holder comprises a fixing base configured to fix the vaporization component, and a mounting base including a mounting hole for mounting the airflow sensing apparatus,
   wherein the start airway is provided on the fixing base,
   wherein the fixing base comprises a base body and a fixing portion disposed on the base body in a protruding manner so as to fix the vaporization component,
   wherein a central column is disposed on the fixing portion and comprises a hollow structure including a first run-through end and a second run-through end that protrude in opposite directions, the first run-through end protruding so as to enter the mounting hole of the mounting base,
   wherein the start airway is provided in the hollow structure of the central column,
   wherein the fixing base further comprises two engagement portions disposed on the base body in a protruding manner and located on two opposite sides of the fixing portion so as to engage with the shell,
   wherein the airflow channel comprises an air inlet channel provided in the shell and located on one end of the holder away from the power supply,
   wherein an air inlet groove configured to communicate the air inlet channel with the vaporization component is provided on the holder, and
   wherein the air inlet groove is provided on a side wall of the fixing portion such that at least a part of the sleeve portion is disposed between the air inlet groove and at least one engagement portion of the two engagement portions.

2. The power supply assembly of claim 1, wherein a through hole configured to connect the vaporization component with the power supply is provided on the fixing portion, and
   wherein the through hole and the start airway are provided at intervals and are isolated from each other.

3. The power supply assembly of claim 1, wherein a liquid storage groove is provided on the base body.

4. The power supply assembly of claim 1,
   wherein the fixing base is disposed on one end of the mounting base away from the power supply.

5. The power supply assembly of claim 4,
   wherein the start airway is in communication with the mounting hole.

6. The power supply assembly of claim 1, further comprising:
   a first seal structure sleeved on a periphery of the airflow sensing apparatus so as to isolate the start airway from the power supply; and
   a connection through hole configured to communicate the start airway with the airflow sensing apparatus, the connection through hole being provided on the first seal structure.

7. The power supply assembly of claim 6, further comprising:
   a second seal structure, the second seal structure being sleeved on the holder to sealedly connect the holder with the shell.

8. The power supply assembly of claim 1, wherein an air inlet hole in communication with the airflow channel is provided on the shell.

9. The power supply assembly of claim 1, further comprising:
   a light emitting device mounted on the holder.

10. The power supply assembly of claim 9, further comprising:
    a light guide component configured to guide light emitted by the light emitting device, the light guide component being mounted on the holder and sleeved on a periphery of the light emitting device.

11. The power supply assembly of claim 10, wherein the holder is clamped to the light guide component.

12. The power supply assembly of claim 1, further comprising:
    a charging interface connected to the power supply.

13. The power supply assembly of claim 12, wherein a mounting opening configured to mount the charging interface is provided on one end of the shell, and
    wherein the mounting opening is provided on one end of the power supply away from the holder.

14. An electronic vaporization device, comprising:
    the power supply assembly of claim 1; and
    the vaporization component connected to the power supply assembly,
    wherein the vaporization component is mounted in the shell of the power supply assembly.

15. The electronic vaporization device of claim 14, wherein the vaporization component comprises:
    a vent tube mounted on the holder; and
    a vaporization element mounted in the vent tube,
    wherein an air outlet is provided on the shell,
    wherein the vent tube is in communication with the air outlet, and
    wherein the airflow channel is formed in the shell and the vent tube.

16. The power supply assembly of claim 1, wherein the second run-through end protrudes so as to engage the vaporization component.

17. The power supply assembly of claim 1, wherein the side wall of the fixing portion surrounds the central column and protrudes in a direction parallel to the central column.

18. The power supply assembly of claim 1, wherein the side wall of the fixing portion comprises a through hole extending in a direction parallel to the central column.

19. A power supply assembly, comprising:
    a holder comprising a fixing base and a mounting base including a mounting hole for mounting an airflow sensing apparatus, wherein the fixing base comprises a base body and a fixing portion disposed on the base body in a protruding manner, wherein a central column is disposed on the fixing portion, the central column comprising a hollow structure including a first run-through end and a second run-through end that protrude in opposite directions, the first run-through end protruding so as to enter the mounting hole of the mounting base, wherein a start airway is formed in the hollow structure of the central column so as to start the airflow sensing apparatus, and wherein the fixing portion of the fixing base comprises a side wall that surrounds the central column.

20. A power supply assembly, comprising:

a holder comprising a fixing base and a mounting base including a mounting hole, wherein the fixing base comprises a base body and a fixing portion disposed on a first surface of the base body in a protruding manner, wherein the mounting base is disposed on a second surface of the base body, the second surface being opposite the first surface, wherein a central column is disposed on the fixing portion, the central column comprising a hollow structure including a first run-through end and a second run-through end that protrude in opposite directions, the first run-through end protruding so as to enter the mounting hole of the mounting base.

* * * * *